US007552206B2

(12) United States Patent  (10) Patent No.: US 7,552,206 B2
Nikolayev et al.  (45) Date of Patent: Jun. 23, 2009

(54) THROTTLING SERVICE CONNECTIONS BASED ON NETWORK PATHS

(75) Inventors: Alexander V. Nikolayev, Kirkland, WA (US); Wilbert De Graaf, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 10/974,109

(22) Filed: Oct. 27, 2004

(65) Prior Publication Data

US 2006/0090004 A1    Apr. 27, 2006

(51) Int. Cl.
 G06F 15/173 (2006.01)
 G06F 15/16 (2006.01)
(52) U.S. Cl. .................................... 709/223; 709/232
(58) Field of Classification Search ................ 713/201; 709/223, 232
See application file for complete search history.

(56) References Cited

U.S. PATENT DOCUMENTS 6,789,203 B1 * 9/2004 Belissent ..................... 726/22
2002/0032717 A1 * 3/2002 Malan et al. ................ 709/105

* cited by examiner

Primary Examiner—Tonia L Dollinger
Assistant Examiner—Anish Sikri
(74) Attorney, Agent, or Firm—Workman Nydegger

(57) ABSTRACT

The present invention protects local services from Denial of Service (DoS) attacks based on network paths or sub-paths used to transfer data between a local service and remote clients. As requests for connections to the local services are received, the network sub-paths corresponding to the requests can be retrieved by a tracing process and/or from a database. Connections or other requests with similar or common network sub-paths are also determined. Based on the number of connections and/or requests with similar or common network sub-paths, the connections and/or requests can be throttled. For example, if the number of connections and/or requests with similar or common network sub-paths exceeds a predetermined threshold, then the connections may be disconnected or requests rejected or delayed for processing.

29 Claims, 3 Drawing Sheets

THROTTLING SERVICE CONNECTIONS BASED ON NETWORK PATHS

CROSS-REFERENCE TO RELATED APPLICATIONS

N/A

BACKGROUND OF THE INVENTION

1. The Field of the Invention

The present invention generally relates to network communications. More specifically, the present invention provides for throttling network connections to a service based on network paths or sub-paths for such communications.

2. Background and Related Art

The rapid growth of computer networks, both public and private, in recent years has been spurred in large part by "client/server computing." In this model one computing device, the client, request that another computing device, the server, provide services or features to it. Note that the "client" and "server" are used solely to denote the parties in a request transaction. While some computing devices are implemented as dedicated services that can serve multiple clients, a client and a server can switch roles from one transaction to another. For instance, in a "peer-to-peer" network (common among, e.g., devices communicating via short range radio), every computing device has the potential to be both a client and a server serially or simultaneously.

Servers often have to allocate precious resources to fulfill a request for a feature or for a service. Upon receiving a request from a client, a server checks the availability of its resources. Traditionally, if the server does not have the resources to fulfill the request, then the server rejects the request. If the client can proceed without the requested feature or service then it does so and resubmits the request later, at which time the server may have the necessary resources available to fulfill the request.

In order to ensure that valuable server resources are dedicated to valid clients, the server needs a mechanism to determine the intent of the requests it receives. For example, a nefarious or malicious client could bring a "Denial of Service" (DoS) attack by repeatedly making requests of the server with the intent of overwhelming it. Although some systems require the client to authenticate itself (and its request will ultimately be rejected), the server may in the mean time utilize so many resources attempting to process the requests and/or authenticate the client that the server exhausts its resources pool until the server is rendered incapable of fulfilling any request, even those made by valid clients. Such DoS attacks can be equally as effective even for systems that don't require the client to authenticate itself.

One solution to above described DoS attacks is to limit the number of available or allowable requests or connections to a service based on the source of the request. For example, services or routers can monitor all of the requests they receive and if too many requests from one address are received in a short period of time, the service or router simply discards them without processing. Such a solution, however, does not take into account machines that have multiple IP addresses. In such instances, a malicious client can create multiple IP addresses for a particular machine and bombard the service with requests for connections with varying IP addresses so that it won't be able to be linked to one another.

Of course there are many forms or causes of what appear to be DoS attacks, some of which are not necessarily malicious but based instead on a simple overload of requests from valid clients that can authenticate. Accordingly, similar to a single machine with multiple IP addresses, merely discarding requests based on the monitoring of addresses will not control such overloads. As such, there exists a need for controlling connections or requests for connections to a service based on something other than simply monitoring IP addresses.

BRIEF SUMMARY OF THE INVENTION

The above-identified deficiencies and drawbacks of current computer networking systems is overcome by the present invention. For example, the present invention provides for protecting local services against the Denial of Service attacks by controlling the number of permitted remote client connections to the local server based on network sub-paths used to transfer data between a local service and remote clients.

Exemplary embodiments provide for receiving a request from a remote client for establishing a connection to a local service. The request traverses a network sub-path that includes at least one node for routing the request from the remote client to the local service. Information about the network sub-path can be retrieved including information that identifies the at least one node. Further, a history of connection requests to the local service with similar sub-paths that include the at least one node are determined. Based on the determined history of connection requests, processing of the request can be throttled for controlling connections to the local service.

Other example embodiments provide for receiving a plurality of requests to establish a plurality of connections with the local service. Information about network sub-paths for the plurality of requests can be retrieved. The network sub-paths having at least one node in common used in routing the plurality of requests to the local service. Based upon a predetermined allowable number of requests with common nodes, the plurality of requests can be throttled for controlling the number of connections to the local service.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for controlling or throttling network connections based on network paths or sub-paths. The embodiments of the present invention may comprise a special purpose or general-purpose computer including various computer hardware, as discussed in greater detail below.

As previously mentioned, a Denial of Service (DoS) attack is an instant in which a user or organization is deprived of the services of resources they would normally expect to have. Typically, the loss of service is the inability of a particular network service, such as email, to be available or the temporary loss of all network connectivity and services. Although usually intentional and malicious, a DoS attack can sometimes happen accidentally by a simple overload of requests. A DoS attack is a type of security breach to a computer system that does not usually result in the theft of information or other security loss. These attacks, however, can cost the targeted person or company a great deal of time and money.

Although typical DoS attacks use multiple computers or spoof IP addresses, a new and emerging DoS attack uses a single machine with a myriad of IP addresses to flood services with requests and established connections. Example embodiments of the present invention prevent this type of Denial of Service attack, as well as a simple overload of requests, by limiting the number of connections and requests with similar network paths or sub-paths.

A message path refers to the route that a message takes in traveling from an initial sender (e.g., a remote client) to an ultimate receiver (e.g., a local service) and can be defined by a routing protocol. A network sub-path, as its name implies, is typically some subset of the full network path as defined by one or more nodes. A node may be a sender or receiver of a request, but can also include one or more intermediary nodes. An intermediary node refers to a device that is neither the initial sender nor ultimate receiver, and acts as both a sender and a receiver for the purposes of processing and forwarding a received message along a defined network path on behalf of either the initial sender or the ultimate receiver. The network path comprises the set of nodes and/or intermediary nodes that process a message when it is created and sent. Although a network sub-path is typically a subset of the network path, note that the term network sub-path in accordance with example embodiments of the present invention should be broadly construed to include the network path or any subset thereof.

Figure 1:
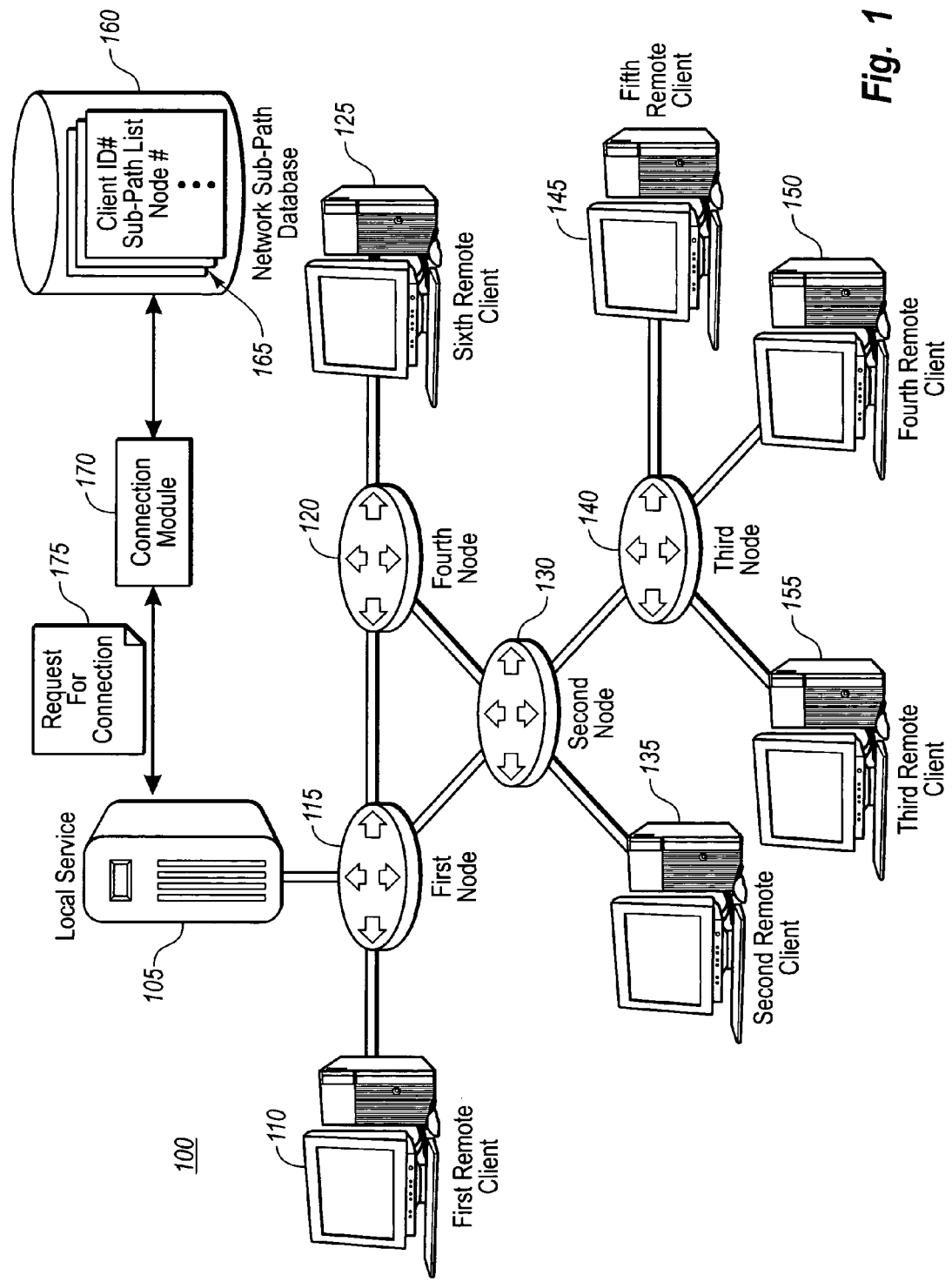
FIG. 1 illustrates a network computing system that uses network sub-paths for controlling connections to a local service in accordance with example embodiments of the present invention.

FIG. 1 illustrates a network system 100 with connection module 170 for throttling processing requests for connections in accordance with exemplary embodiments. In this distributed network system 100, as requests for connections 175 are received at local service 105, connection module 170 retrieves information about the network sub-path that includes information for identifying one or more nodes and/or intermediary nodes used to route requests 175 to the local service 105. If a threshold of requests and/or connections to local service 105 with similar or common network sub-paths are approximated or exceeded, connection module 170 can throttle processing of requests 175 in order to control the connections to the local service 105.

For example, say a network sub-path includes third intermediary node 140, second intermediary node 130 and first intermediary node 115 with a requirement that only one established connection to local service 105 with this similar sub-path is allowed. Further assume that a remote client, e.g., third remote client 155, has established a connection by way of the network sub-path for third node 140, second node 130 and first node 115. In such instance all subsequent requests 175 received at connection module 170 or local service 105 with a network sub-path that includes these same nodes 140, 130, 115 will be throttled.

Note that the number of requests and/or connections compared against some threshold value for throttling purposes may be historical data. That is, the throttling may be based on the number of existing connection requests, past connection requests, or both. Further note that throttling can include not only delaying or slowing processing the requests 175, or rejecting the requests 175 all together, but can also include speeding up the processing when there are too few connections with similar or common network sub-paths. Note also, that connection module 170 may also throttle the connections by disconnecting or slowing processing of data through such connections.

Further note, as mentioned above, that although the present invention is typically used to prevent Denial of Service attacks from a single client, it can also be used to control the flow of traffic from multiple clients when load balancing. For example, take the instance described above where sub-path with third node 140, second node 130 and first node 115 allows for only one connection, and wherein third remote client 155 already has a connection with that same or similar network sub-path. Requests 175 from fourth remote client 150 or fifth remote client 145 that traverse this similar or common network sub-path will be throttled by connection module 170 for controlling the connections to local service 105. In other words, the present invention not only prevents DoS attacks, but can also be used for load balancing based on network topology or geography as defined by network sub-paths.

Other example embodiments allow the threshold of the number of request 175 or connections to local service 105 to vary based on the various network sub-paths or nodes. For example, because all traffic within the distributed system 100 must flow to local service 105 through first intermediary node 115, more connections or requests for connections 175 with sub-paths that include first intermediary node 115 may be tolerated. On the other hand, requests 175 with network sub-paths that include intermediary nodes farther out in the distributed system from the local service 105 will typically have lower thresholds or allowable number of connections and/or requests 175. For instance, first intermediary node 115 may be allowed to have three connections, whereas connections with network sub-paths that include second node 130 and first node 115 may be limited to two connections. Accordingly, if first remote client 110 second remote client 135 and sixth remote client 125 are connected to local service 105, the threshold number of connections for first intermediary node 115 is met and all subsequent requests 175 from any of the remote clients within the distributed system 100 will be throttled.

If on the other hand, assuming the same requirements above, say second remote client 135 has a connection with local service 105 utilizing a network sub-path that includes second node 130 and first node 115. Further assume that third remote client 155 has a connection to the local service 105 using network sub-path including third node 140, second node 130 and first node 115. Then based on the fact that three connections can be established with network sub-paths that include first node 115, a request 175 or connection with a network sub-path with intermediary first node 115 is still available. Note, however, that the connections with sub-paths including second node 130 and first node 115 are limited to just two connections; and the threshold value has already been established through connections established by second remote client 135 and third remote client 155. Accordingly, subsequent requests from second remote client 135, third remote client 155, fourth remote client 150 and/or fifth client 145 with the similar network sub-paths that include second node 130 and first node 115 will have their requests 175 for connections throttled.

Note that although the above examples compare the number of existing connections with requests 175 received with similar or common network sub-paths, the present invention is not limited to such comparison. For example, the present invention can compare network sub-paths for a plurality of requests 175, wherein if a predetermined number of requests 175 with similar or common network sub-paths are received then the requests may be throttled. Further, the present invention can compare the network sub-paths of existing connections to the local service 105, wherein if a predetermined number of connections with similar sub-paths are met or exceeded then the connections themselves can be throttled. Accordingly, any comparison of particular connections or requests 175 with similar or common sub-paths is used for illustrative purposes only and is not meant to limit or otherwise narrow the scope of the present invention unless explicitly claimed.

As one would recognize, connection module 170 can retrieve information about network sub-paths through many well-known ways. For example, connection module 170 can use a tracing mechanism by utilizing a ping utility for sending echo requests (or other types of requests) destined for the remote client seeking connections with the local service 105. In such instance, a multitude of messages can be sent with the same source address as the remote client, but with different time-to-live (TTL) restrictions (e.g., 1-30 hops). As the messages traverse the different nodes, when each TTL expires the node where the message expired will send a timeout message identifying itself back to the connection module 170 or local service 105. Knowing the TTL for each message sent and identifying the different messages, a network sub-path can be traced back to the remote client who created the request or connections. For example, when a TCP/IP protocol is used the internet control message protocol (ICMP), can be utilized for such tracing purposes.

Alternatively, or in conjunction, the sub-path information may be retrieve from a network sub-path database 160. The network sub-path information 165 should uniquely identify the client through, e.g., IP address and provide connection module 170 with a network sub-path list including the various intermediary nodes used to route information to the local service 105. The network sub-path database 160 can include sub-path information 165 that was either generated through the tracing mechanism described above and then stored, and/or be based on an outside service that collects the sub-path information 165 on behalf of the local service 105.

Note that data may be transferred to the local service 105 in a network path or sub-path that is different than the retrieved sub-path information. For example, sixth remote client 125 may be identified as having a network sub-path that includes first node 115 and fourth node 120, but actually routes requests 175 from fourth node 120 through second node 130 to first node 115. Such occurrences, however, will typically happen with a low probability; and therefore such situations are not a serious concern for preventing Denial of Service attacks or for load balancing in accordance with the present invention.

Also note that although FIG. 1 illustrates routers for the intermediary nodes and a server for local service 105, other machines for the intermediary nodes and topologies are available to the present invention. For example, intermediary nodes may be any one of a proxy, a network PC, a peer device, access server or any other computing system for routing data. In addition, first node 115 may be a remote client that sends a request. Accordingly, the present invention extends to sub-paths with a single node.

The local service 105 can also be any one of a message server, Web server, DNS server, NNTP server, Peer-to-Peer server, SIP server, RTP/RTSP server or FTP server, etc. Further, local service 105 could be a remote client or any other similar machine where Denial of Service attacks can occur. Further, although connection module 170 and sub-path database 160 are shown as separate units, one or more of these may reside on a single machine, e.g., local service 105. Based on the foregoing reasons, the topology and computing machines shown in FIG. 1 are used for illustrative purposes only and are not meant to limit or otherwise narrow the scope of the present invention unless explicitly claimed.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and non-functional acts may be described or claimed in a particular order, the present invention is not necessarily limited to any particular ordering or combination of steps and/or acts. Further, the use of steps and/or acts in the recitation of the claims and in the following description for the flow charts of FIGS. 2 and 3 are used to indicate the desired specific use of such terms.

Figure 3:
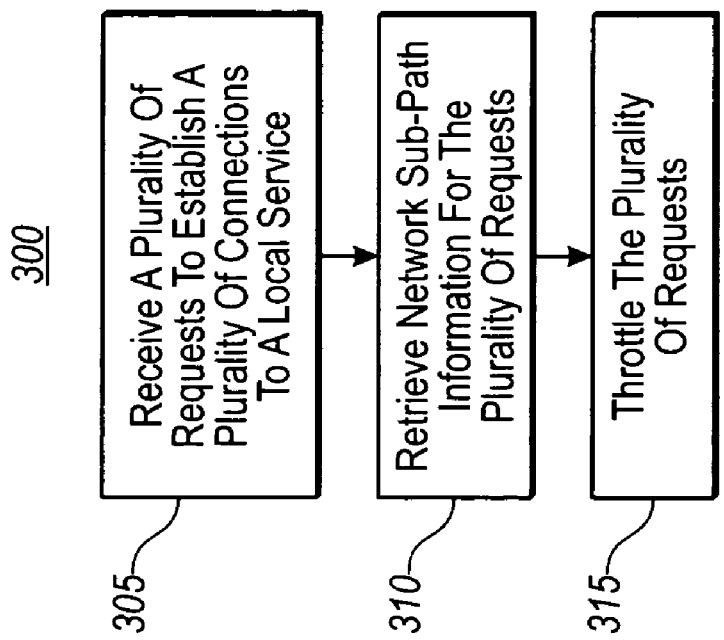
FIG. 3 illustrates an example flow chart of a method of controlling the number of permitted remote client requests for connections to a local service in accordance with example embodiments of present invention.
Figure 2:
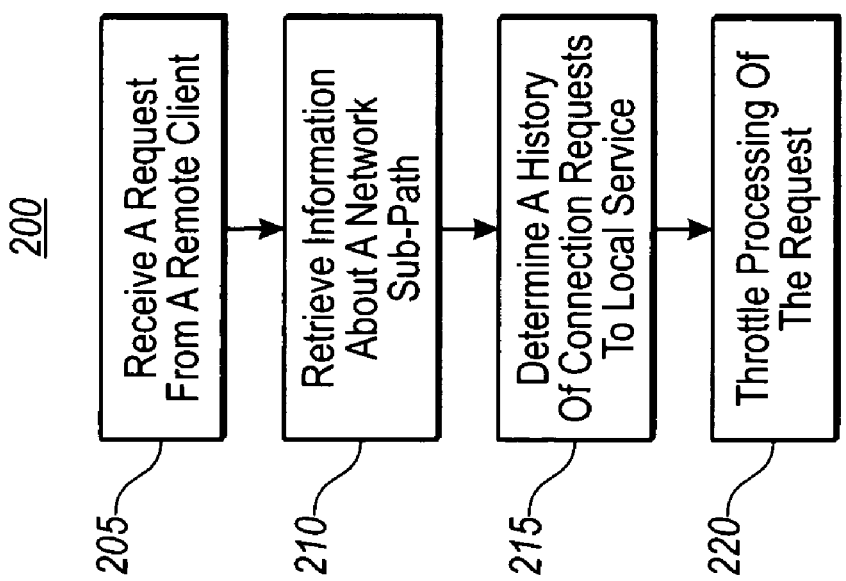
FIG. 2 illustrates an example flow chart of a method of protecting a local service against Denial of Service attacks in accordance with example embodiments of the present invention.

FIGS. 2 and 3 illustrate example flow charts for various exemplary embodiments of the present invention. The following description of FIGS. 2 and 3 will occasionally refer to corresponding elements from FIG. 1. Although reference may be made to a specific element from FIG. 1, such elements are used—for illustrative purposes only and are not meant to limit or otherwise narrow the scope of the present invention unless explicitly claimed.

FIG. 2 illustrates and example flow chart of a method 200 for protecting a local service against Denial of Service attacks. Method 200 includes an act of receiving 205 a request from a remote client. For example, local service 105 may receive a request for a connection 175 from, e.g., second remote client 135, for establishing a connection thereto. The request 175 will traverse a network sub-path that includes a node for routing the request from the remote client 135 to the local service 105. For instance, sub-path for second remote client 135 may include second intermediary node 130 and first intermediary node 115. Alternatively, the sub-path may just include node 115 in the instance that the node is the remote client.

Method 200 also includes an act of retrieving 210 information about a network sub-path. For example, connection module 170 can retrieve information about the network sub-path for second remote client 135 including information that identifies one or more of the nodes, e.g., 115, 130. Information about the network sub-path may be retrieved from a database 160 or retrieved by a tracing process, e.g., when the request 175 is transferred in accordance with a TCP/IP and the tracing process utilizes ICMP as described above.

Method 200 also includes an act of determining 215 a history of connection requests to the local service. The history of connection requests may include, for example, a number of existing connection requests, past connection requests, or both. As such, connection module 170 can determine the history of connection requests to the local service 105 with similar network sub-paths that include one or more of the nodes of the network sub-path for the request 175. Based upon the determined history of connection requests, method 200 further includes an act of throttling 220 processing of the request. For example, connection module 170 can be used to determine a threshold value for the number of existing connection requests, past connection requests, or both, and based on this threshold value, throttle the processing of the request 175 for controlling connections to local service 105.

In the case were the tracing process is used, other exemplary embodiments provide for storing in memory, e.g., database 160, the information about the network sub-path for the request 175. A second request 175 from second remote client 135 may be received at the local service 105. The information about the network sub-path for the request 175 can be retrieved from the memory or database 160. A number of existing connections to the local service 105 with similar network sub-paths that include similar nodes may then be determined. Based on the determined number of existing connection requests, past connection requests, or both, the processing of the second request 175 can be throttled for controlling connections to the local service 105.

Further, in the case where the determined number of existing connection requests, past connection requests, or both, meets a predetermined threshold the throttling may be one or more of rejecting the request or sending a rejection message to the remote client. On the other hand, if the determined number of existing connection requests, past connection requests, or both, is close to or meets the predetermined threshold, the throttling may slow or delay the processing of the request 175. Alternatively, if the determined number of existing connection requests, past connection requests, or both, is below the predetermined threshold, the throttling may speed up the processing of the request 175.

FIG. 3 illustrates a flow chart of a method 300 for controlling the number of permitted remote client request for connections to a local service based on network sub-path used to transfer data between a local service and remote clients. Method 300 includes an act of receiving 305 a plurality of requests to establish a plurality of connections to a local service. For example, local service 105 or connection module 170 may receive a plurality of requests 175 to establish a plurality of connections with local service 105. Method 300 also includes an act of retrieving 310 network sub-path information for the plurality of requests. For instance, connection module 170 can be used to retrieve information about the network sub-paths for the plurality of requests 175, wherein the network sub-paths have at least one node in common, which was used in routing the plurality of requests to the local service 105.

Based on a predetermined allowable number of requests with one or more common nodes, method 300 further includes an act of throttling 315 the plurality of requests. That is, connection module 170 can be used for determining an allowable number of requests with common nodes, and throttle the plurality of requests 175 for controlling the number of connections to the local service 105. The number of requests may be based on historical data such as current and/or past connection requests.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
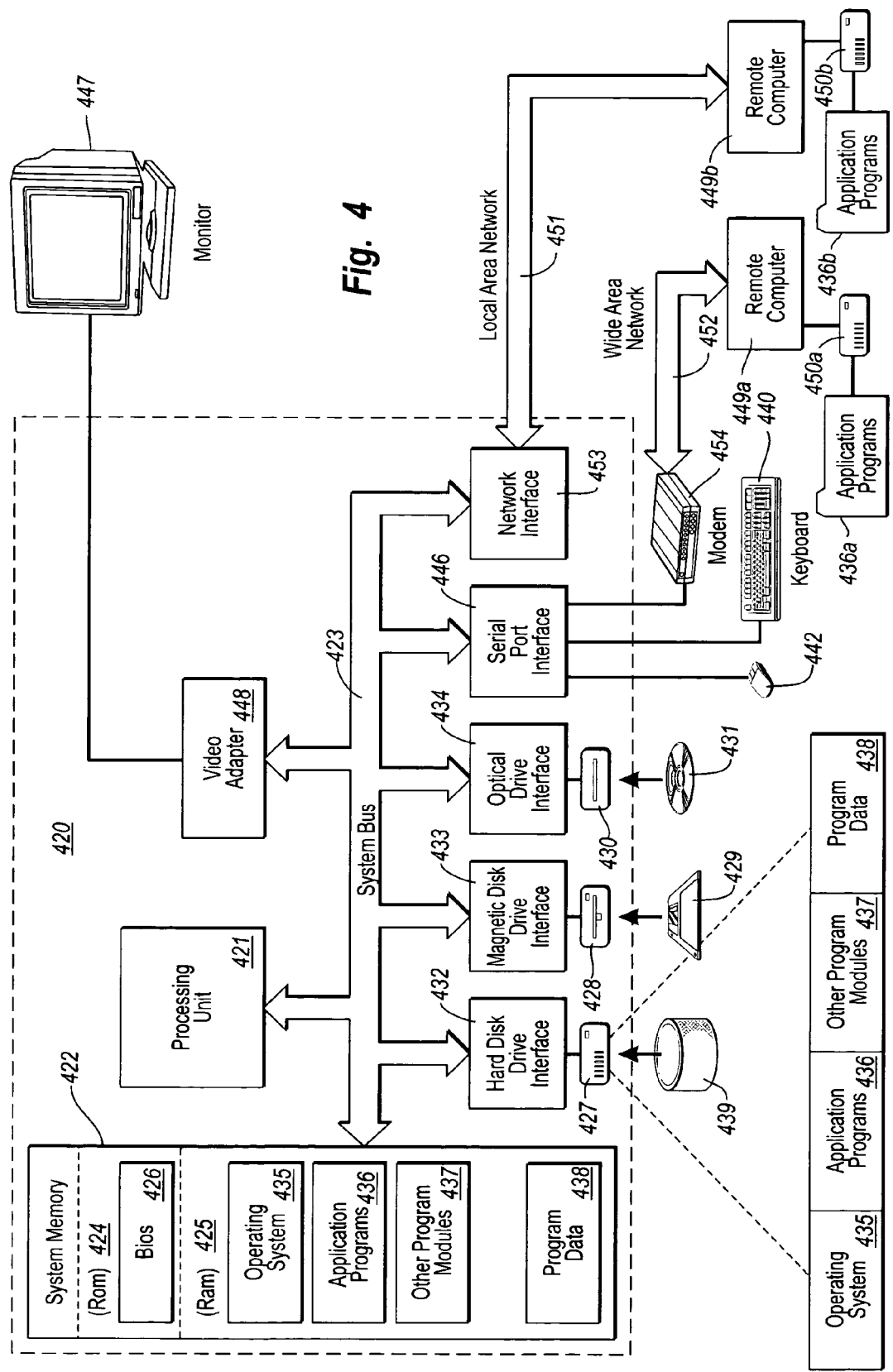
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer network comprising a local service that receives requests for data from remote clients using a data transport protocol, a method of protecting the local service against denial of service attacks by controlling the number of permitted remote client connections to the local service based on network sub-paths used to transfer data between the local service and the remote clients, the method comprising acts of:

receiving a first request from a remote client for establishing a connection to a local service, the first request traversing a network sub-path that includes at least one intermediary node for routing the first request from the remote client to the local service;

upon receiving the first request from the remote client, using a tracing protocol to detect the network sub-path over which the first request traversed;

accessing a database that stores network sub-paths for other requests that have been received by the local service;

determining that a number of the other requests traversed the same network sub-path as the first request, the same network sub-path including the at least one intermediary node;

determining that the total number of requests that traversed the same network sub-path during the predefined period of time exceeds a predefined level, wherein the total number of requests includes the number of other requests that traversed the same network sub-path as the first request, and the first request; and upon determining that the total number of requests that traversed the same network sub-path exceeds the predefined level, throttling processing of the first request for controlling connections to the local service.

2. The method of claim 1, wherein the at least one intermediary node is one or more of a router, proxy, a network PC, a peer device, access server or other computing system.

3. The method of claim 1, wherein the other requests includes a number of existing connection requests, past connection requests, or both, and wherein the act of throttling is one or more of rejecting the first request or sending a rejection message to the remote client.

4. The method of claim 1, wherein the other requests includes a number of existing connection requests, past connection requests, or both, and wherein the total number of requests is close to or meets a predetermined threshold and the act of throttling slows or delays the processing of the first request.

5. The method of claim 1, wherein the other requests includes a number of existing connection requests, past connection requests, or both, and wherein the total number of requests is below a predetermined threshold and the act of throttling speeds up the processing of the first request.

6. The method of claim 1, wherein the local service is one of a message server, Web server, DNS server, NNTP server, Peer-to-Peer server, SIP server, RTP/RTSP server or FTP server.

7. In a computer network comprising a local service that receives requests for data from remote clients using a data transport protocol, a method of protecting the local service against denial of service attacks by controlling the number of permitted remote client requests for connections to the local service based on network sub-paths used to transfer data between the local service and the remote clients, the method comprising acts of:

receiving a plurality of requests to establish a plurality of connections with a local service, the plurality of requests traversing a network sub-path that includes at least one intermediary node for routing the plurality of requests to the local service;

for each of the plurality of requests, using a tracing protocol to detect the network sub-path over which the request traversed;

accessing a database that stores network sub-paths for other requests that have been received by the local service;

determining that a number of the other requests traversed the same network sub-path as one or more of the plurality of requests, the same network sub-path including the at least one intermediary node;

determining that the total number of requests that traversed the same network sub-path during a predefined period of time exceeds a predefined level, wherein the total number of requests includes the number of other requests that traversed the same network sub-path as the one or more of the plurality of requests, and the one or more of the plurality of requests;

upon determining that the total number of requests that traversed the same network sub-path exceeds the predefined level, throttling the one ore more of the plurality of requests for controlling the number of connections to the local service.

8. The method of claim 7, wherein the at least one intermediary node is one or more of a router, proxy, a network PC, a peer device, access server or other computing system.

9. The method of claim 7, wherein the act of throttling is one or more of rejecting the one or more of the plurality of requests or sending a rejection message to one or more remote clients that generated the one or more of the plurality of requests.

10. The method of claim 7, wherein the act of throttling slows or delays the processing of the one or more of the plurality of requests.

11. The method of claim 7, wherein the plurality of requests are transferred to the local service in accordance with TCP/IP and the tracing protocol is ICMP.

12. The method of claim 11, further comprising an act of:
storing in the database the network sub-paths for each of the plurality of requests.

13. The method of claim 7, wherein the plurality of requests are from a single remote client.

14. The method of claim 7, wherein the local service is one of a message server, Web server, DNS server, NNTP server, Peer-to-Peer server, SIP server, RTP/RTSP server or FTP server.

15. In a computer network comprising a local service that receives requests for data from remote clients using a data transport protocol, a computer program product for implementing a method of protecting the local service against denial of service attacks by controlling the number of permitted remote client connections to the local service based on network sub-paths used to transfer data between the local service and the remote clients, the computer program product comprising memory having stored thereon computer executable instructions that, when executed by a processor, can cause the messaging system to perform the following:

receive a first request from a remote client for establishing a connection to a local service, the first request traversing a network sub-path that includes at least one intermediary node for routing the first request from the remote client to the local service;

upon receiving the first request from the remote client, use a tracing protocol to detect the network sub-path over which the first request traversed;

access a database that stores network sub-paths for other requests that have been received by the local service;

determine that a number of the other requests traversed the same network sub-path as the first request, the same network sub-path including the at least one intermediary node;

determine that the total number of requests that traversed the same network sub-path during a predefined period of time exceeds a predefined level, wherein the total number of requests includes the number of other requests that traversed the same network sub-path as the first request, and the first request; and upon determining that the total number of requests that traversed the same network sub-path exceeds the predefined level, throttle processing of the first request for controlling connections to the local service.

16. The computer program product of claim 15, wherein the at least one intermediary node is one or more of a router, proxy, a network PC, a peer device, access server or other computing system.

17. The computer program product of claim 15, wherein the other requests includes a number of existing connection requests, past connection requests, or both, and wherein the act of throttling is one or more of rejecting the first request or sending a rejection message to the remote client.

18. The computer program product of claim 15, wherein the other requests include a number of existing connection requests, past connection requests, or both, and wherein the total number of requests is close to or meets a predetermined threshold and the act of throttling slows or delays the processing of the first request.

19. The computer program product of claim 15, wherein the other requests includes a number of existing connection requests, past connection requests, or both, and wherein the total number of requests is below a predetermined threshold and the act of throttling speeds up the processing of the first request.

20. In a computer network comprising a local service that receives requests for data from remote clients using a data transport protocol, a computer program product for implementing a method of protecting the local service against denial of service attacks by controlling the number of permitted remote client requests for connections to the local service based on network sub-paths used to transfer data between the local service and the remote clients, the computer program product comprising memory having stored thereon computer executable instructions that, when executed by a processor, can cause the messaging system to perform the following:

receive a plurality of requests to establish a plurality of connections with a local service, the plurality of requests traversing a network sub-path that includes at least one intermediary node for routing the plurality of requests to the local service;

for each of the plurality of requests, use a tracing protocol to detect the network sub-path over which the request traversed;

access a database that stores network sub-paths for other requests that have been received by the local service;

determine that a number of the other requests traversed the same network sub-path as one or more of the plurality of requests, the same network sub-path including the at least one intermediary node;

determine that the total number of requests that traversed the same network sub-path during a predefined period of time exceeds a predefined level, wherein the total number of requests includes the number of other requests that traversed the same network sub-path as the one or more of the plurality of requests, and the one or more of the plurality of requests;

upon determining that the total number of requests that traversed the same network sub-path exceeds the predefined level, throttle the one or more of the plurality of requests for controlling the number of connections to the local service.

21. The computer program product of claim 20, wherein the at least one intermediary node is one or more of a router, proxy, a network PC, a peer device, access server or other computing system.

22. The computer program product of claim 20, wherein the act of throttling is one or more of rejecting the one or more of the plurality of requests or sending a rejection message to one or more remote clients that generated the one or more of the plurality of requests.

23. The computer program product of claim 20, wherein the act of throttling slows or delays the processing of the one or more of the plurality of requests.

24. The computer program product of claim 20, wherein the plurality of requests are transferred to the local service in accordance with TCP/IP and the tracing protocol ICMP.

25. The computer program product of claim 24, further comprising computer executable instructions that cause the messaging system to perform the following:

store in the database the network sub-paths for each of the plurality of requests.

26. The computer program product of claim 20, wherein the plurality of requests are from a single remote client.

27. The computer program product of claim 20, wherein the local service is one of a message server, Web server, DNS server, NNTP server, Peer-to-Peer server, SIP server, RTP/RTSP server or FTP server.

28. The method of claim 1, wherein each of the other requests was made by the remote client, and at least one of the other requests was made using an IP address that is different from the IP address of the first request.

29. The method of claim 1, wherein at least one of the other requests was made by one or more other remote clients.

* * * * *